(12) United States Patent
Cedell (10) Patent No.: US 7,282,822 B2
(45) Date of Patent: Oct. 16, 2007

(54) SENSOR

(75) Inventor: Tord Cedell, Bjärred (SE)

(73) Assignee: Covial De vice AB, Helsingborg (SE)

( * ) Notice: Subject to any disclaimer, the term of this patent is extended or adjusted under 35 U.S.C. 154(b) by 205 days.

(21) Appl. No.: 10/518,126

(22) PCT Filed: May 28, 2003

(86) PCT No.: PCT/SE03/00871

§ 371 (c)(1),
(2), (4) Date: Dec. 15, 2004

(87) PCT Pub. No.: WO04/001353

PCT Pub. Date: Dec. 31, 2003

(65) Prior Publication Data

US 2005/0242806 A1  Nov. 3, 2005

(30) Foreign Application Priority Data

Jun. 20, 2002 (SE) .................................. 0201927

(51) Int. Cl.
*G01H 11/02* (2006.01)
(52) U.S. Cl. .......................................... 310/26; 73/649
(58) Field of Classification Search ................ 310/26; 73/649
See application file for complete search history.

(56) References Cited

U.S. PATENT DOCUMENTS

| | | | |
|---|---|---|---|
| 4,463,610 A | 8/1984 | Anderson, III et al. | |
| 5,194,806 A | 3/1993 | Obama | |
| 5,275,049 A | 1/1994 | Schiessle et al. | |
| 5,321,985 A | 6/1994 | Kashiwagi et al. | |
| 5,982,054 A | 11/1999 | Rathore et al. | |
| 6,018,296 A * | 1/2000 | Herzer ..................... | 340/572.5 |
| 2003/0035256 A1 * | 2/2003 | Hayashi et al. ........ | 360/324.12 |
| 2004/0061980 A1 * | 4/2004 | Haneda et al. ............... | 360/324 |
| 2004/0233588 A1 * | 11/2004 | Oohashi et al. ........ | 360/324.12 |
| 2006/0198058 A1 * | 9/2006 | Ide et al. ............... | 360/324.11 |

FOREIGN PATENT DOCUMENTS

| | | |
|---|---|---|
| DE | 43 09 413 A1 | 9/1994 |
| EP | 0 330 311 B1 | 8/1989 |
| JP | 11-194158 * | 7/1999 |

* cited by examiner

*Primary Examiner*—Thomas M. Dougherty
(74) *Attorney, Agent, or Firm*—Tarolli, Sundheim, Covell & Tummino LLP (57) ABSTRACT

The disclosure relates to a method and an apparatus for sensing and indicating permanent state deviations via detection of temporary inner material oscillations in real time in parts of importance for hardware design and construction, within existing production equipment, e.g. machinery, and/or monitoring of previously built-up infrastructure. One or more at least approximately 20 μm thick amorphous or nanocrystalline band elements with high permeability and relatively high magnetostriction are applied to a pertinent part, the band element or elements, respectively, being at least partially surrounded by a multi-turn coil, such atomic movements (oscillations) as occur in any optional such state deviation in the part being transferred to the band element/elements. The deviation either gives rise to a clearly measurable and detectable magnetic flow change (dB/dt) in the coil in proportion to said atomic movements, or to a similarly measurable and detectable inductance change in the coil/coils.

16 Claims, 9 Drawing Sheets

SENSOR

TECHNICAL FIELD

The present invention relates to a method and an apparatus for sensing and indicating of permanent state deviations via detection of temporary, inner material oscillations in real time in parts of importance for hardware design and construction such as, for example, in prototype testing, in existing production equipment within industry, and/or monitoring and thereby maintaining previously constructed infrastructure.

BACKGROUND ART

Recent years' developments within the area of microelectronics, above all the evolution of increasingly powerful memories for computers has entailed that transducers or sensors of different types occurring on the market such as accelerometers, flexural/deformation indicators, indicators for acoustic emission and so on which are intended for measuring magnitudes of importance to the dimensioning of products in design have proved to be excessively complex in their construction and, as a result, excessively space-consuming and costly for application to the extent which modern hardware design increasingly demands and which, in particular, modern software permits.

BRIEF SUMMARY OF THE INVENTION

One major object of the present invention is, therefore, to realise a transducer element or sensor and arrangement thereof which, in principle, are extremely simple and thereby so space-saving in their construction that previously inconceivable transducer- or sensor configurations may be realised, at the same time as the opportunity is afforded of measurement with considerably greater sensitivity and accuracy within broader ranges than has hitherto been possible, and moreover the measurement of previously almost undetectable magnitudes has been made possible. A further object of the present invention is to realise a sensor arrangement which has a so slight inherent mass that the magnitude which it has for its object to detect cannot be affected thereby.

The above outlined objects will be attained by a method and an apparatus wherein the apparatus consists of one or more at least about 20 µm thick amorphous or nanocrystalline band elements of high permeability and relatively high magnetostriction being applied to the pertinent part, the band elements being, for attaining a desirable material structure, treated by magnetic heat treatment, the band elements being at least partly surrounded by multi-turn coils, such atomic movements as occur in an optional such state deviation being transmitted to the band element/elements either giving rise to a clearly measurable and detectable magnetic flow change (dB/dt) in the coil in proportion to said atomic movements, or to a similarly measurable and detectable inductance change in the coil/coils.

BRIEF DESCRIPTION OF THE ACCOMPANYING DRAWINGS

The present invention will now be described in greater detail hereinbelow, with reference to the accompanying Drawings. In the accompanying Drawings.

DETAILED DESCRIPTION

Application as Glass Breakage Sensor

Functional Principle

The transducer or indicator consists of an amorphous ferromagnetic material which possesses the property that it may be given extremely high permeability, $5,000<\mu<200,000$, at the same time as it has, for certain alloy compositions, a relatively high magnetostriction, $5<\lambda_{sat}<40$ ppm. Taken as a whole, this gives a material with a very high magneto-elastic relationship and Is therefore extremely suitable as sensor material.

By employing a band approx. 3*10 mm which is cut from a sheet of amorphous material of a thickness of 22 µm and thereafter glued on an optional material, stretching in the material can be detected. The amorphous material may be given different properties by cutting it in different directions in relation to the rolling direction, in the present case use has been made of longitudinally and transversely of the rolling direction.

Figure 1:
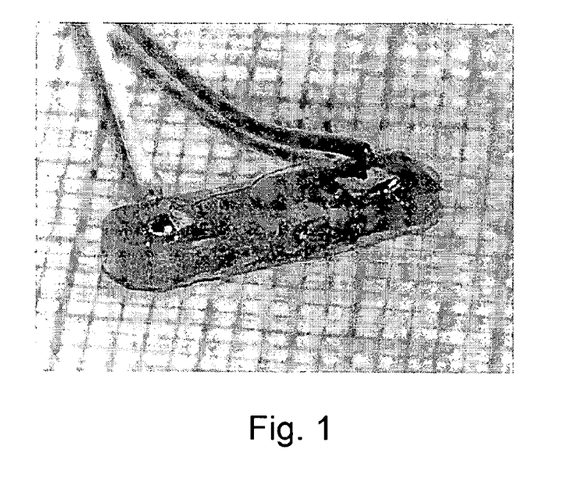
FIG. 1 shows a sensor for acoustic emission photographed on a millimetre paper.

The material parameters may also be modified by heat treating the material in magnetic fields in temperatures close to but below the crystallisation temperature. In the case of breaking glass and general acoustic emission, the magnetic flow change is detected in that a multi-turn coil is wound around the band, see FIG. 1 and FIG. 2.

Theory

In order to detect high frequency signals, it is advantageous and simple merely to detect the flow change and assume that it is proportional to the size of the deformation to the band. This implies that a magnetically well-defined initial state must be achieved, since an unmagnetised band gives no flow change in stretch change.

In order to attain a magnetised basic state, in principle the earth magnetic state is sufficient of 30-60 µT (20-40 A/m), but on the other hand it is unpractical to need to monitor the direction and size of the earth magnetic field when an indicator is to be mounted and calibrated.

There are two ways of attaining a satisfactory initial state:
Lightly magnetic encapsulation and direct current through the pickup coil.
Lightly magnetic encapsulation and bias magnetisation with permanent magnet.

The size of the field should be such that the magnetisation will be 0.2-0.7 T, which implies that the magnetising field in the band should be of the order of magnitude of 2-56 A/m. The size of the field may generally be calculated from the formula $$H = \frac{B}{\mu_0 \cdot \mu}$$

where H is the magnetising field, B is the magnetic flow density, the permeability for free space $\mu_0 = 4\pi \cdot 10^{-7}$ Vs/Am and the relative permeability µ for, in this case, the amorphous band.

The measurement signal is obtained by detecting the flow change in the band because of stretching/compression. For the linear case, the following connected equation should describe the function:

$$\Delta B = d \cdot \Delta\sigma + \mu_0 \cdot \mu \cdot \Delta H$$

Where σ describes mechanical stress and d is the magneto-elastic relationship coefficient. The prefix Δ describes the change from the original value. The material parameter d may be approximated by taking maximum magnetostriction at constant mechanical stress, Δσ=0, divided by magnetising field in magnetic saturation, i.e.

$$\frac{\lambda_{max}}{H_{max}} = d$$

since $$\Delta\lambda = \frac{\Delta\sigma}{E^H} + d \cdot \Delta H$$

which, with $\lambda_{max} = 35 \cdot 10^{-6}$ and $H_{max} = 200$ A/m, gives the relationship factor $d = 1.75 \cdot 10^{-7}$ m/A, a very high value for all types of magneto elastic relationship.

Figure 4A:
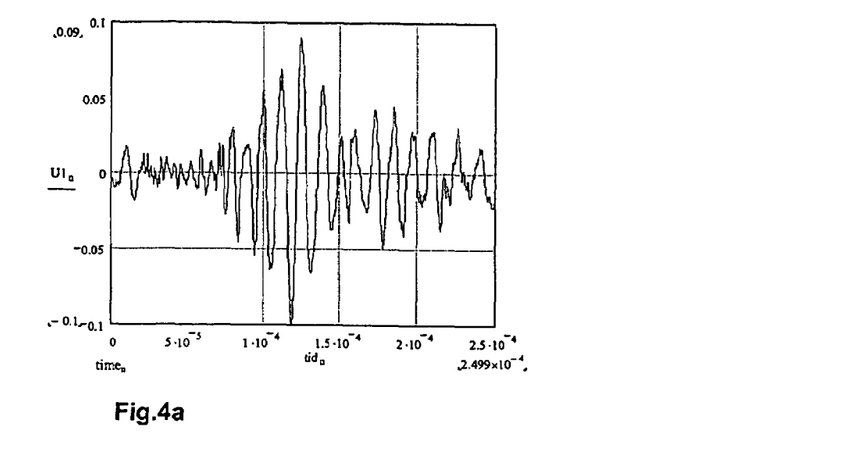
FIG. 4 shows a time signal from each respective transducer P1_1 (a. top), P1_2 (b. centre) and P1_3 (c. bottom)
Figure 4B:
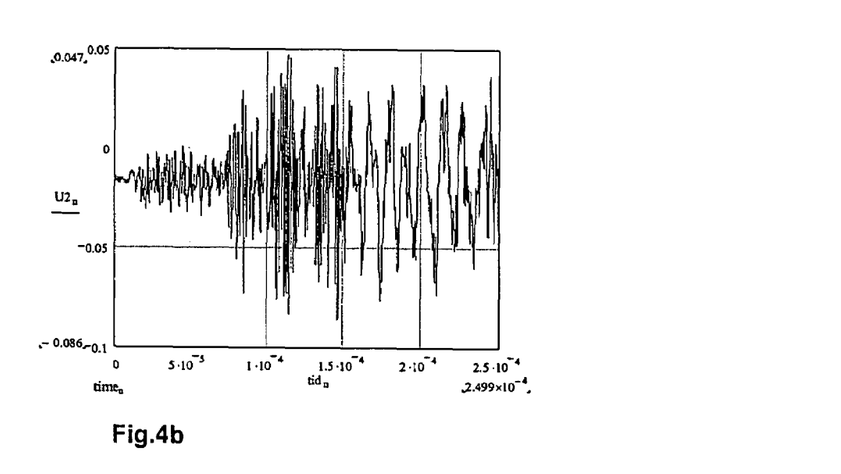
Figure 4C:
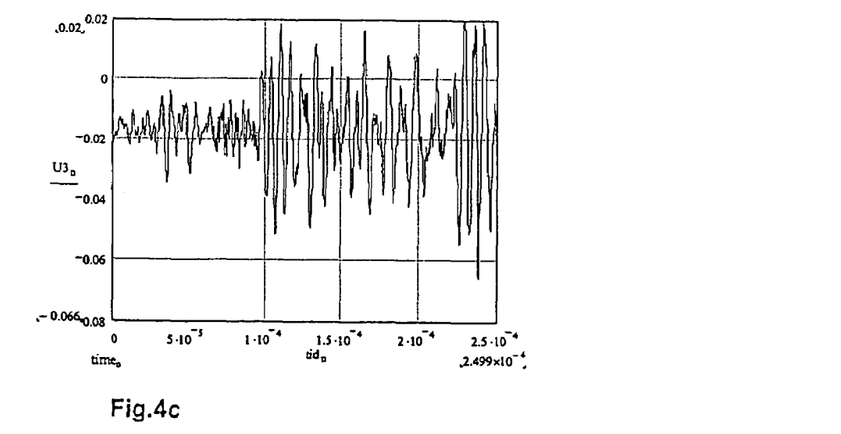
Figure 5A:
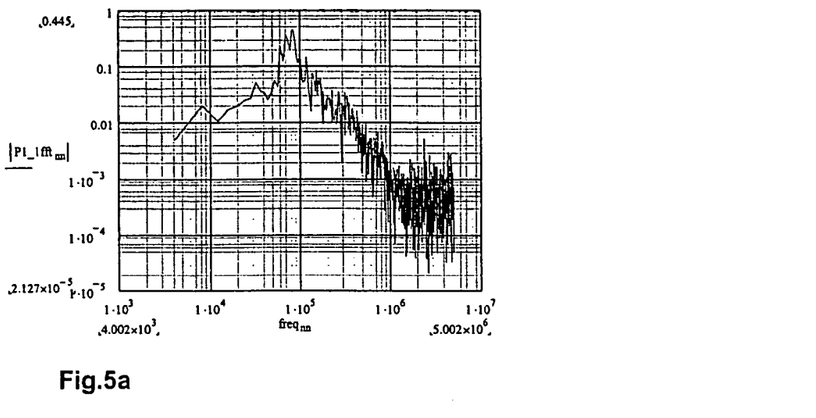
FIG. 5 shows the frequency spectra over the output signals on breaking of glass for P1_1, P1_2 and P1_3 (a. top, b. centre and c. bottom, respectively)
Figure 5B:
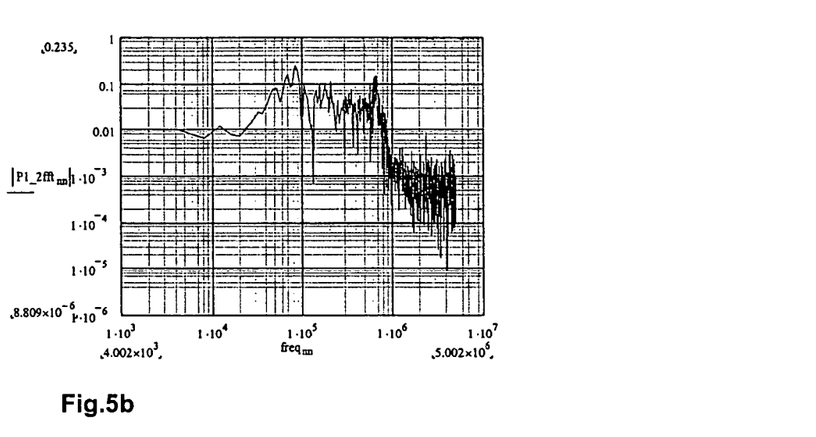
Figure 5C:
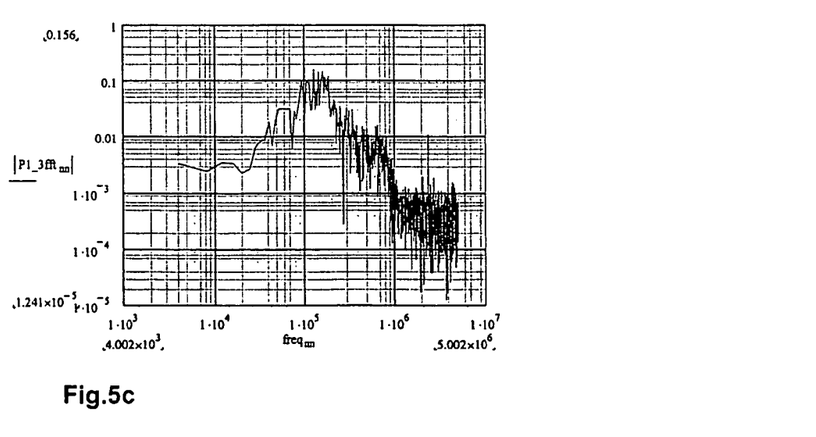
Figure 6:
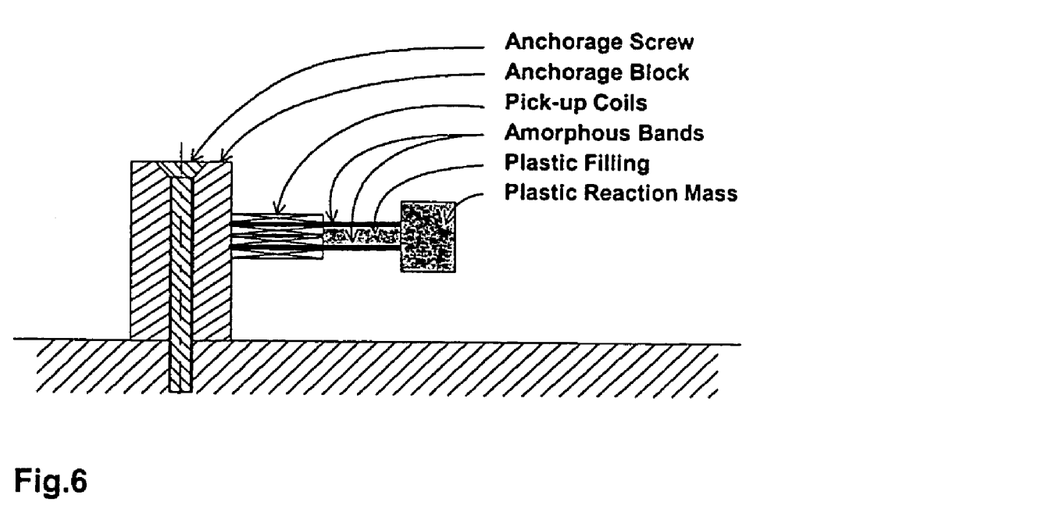
FIG. 6 is a schematic diagram of a possible realisation of an accelerometer which is based on amorphous material.
Figure 7:
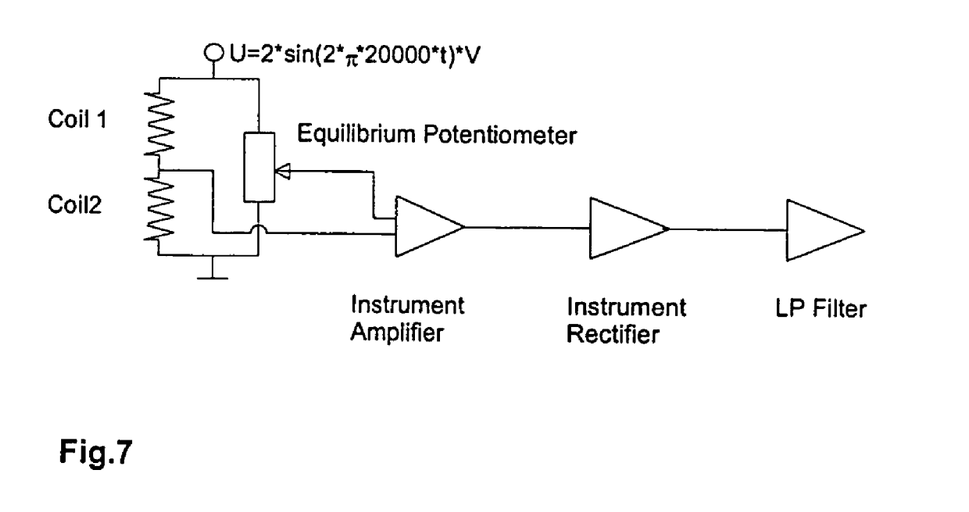
FIG. 7 shows the connection of the accelerometer and the principle of processing of signals therefrom.

The output signal which may be expected is proportional to the flow change and the mechanical stress $$U(t) = N \cdot A \cdot \frac{dB}{dt}$$

where N is the number of turns in the pickup coil and A is the cross sectional area of the amorphous band. By the assumption that ΔH=0, the following equations apply:

$$\begin{cases} \Delta\sigma = \Delta\lambda \cdot E^H \\ \Delta B = d \cdot \Delta\sigma \end{cases}$$

where $E^H$ is the modulus of elasticity in constant magnetising field. The transition to the frequency plane and the utilisation of the above equations give:

$$\hat{U} = |N \cdot A \cdot \omega \cdot d \cdot \Delta\hat{\lambda} \cdot E^H|$$

where ω is the angular frequency in rows/sec. The circumflex indicates that the amplitude value is intended. With the assumption that the modulus of elasticity is of the order of magnitude of 100 GPa, the stretching in the sensor at 100,000 kHz should be of the order of magnitude of 0.0025 ppm for the case P1_2, see FIG. 4 and FIG. 5 centre.

Measurement Results

Initial experiments with sensors glued to a glass slide show that vibrations in the frequency range 40 kHz-1 MHz can be detected.

The following comparative tests have been carried out:

TABLE 1

| | description of indicator | | | |
|---|---|---|---|---|
| Sensor | Orientation of band | Number turns | Comments | Static unloaded permeability [mH] |
| P1_1 | Transverse | 280 | Thick glue joint | 158 |
| P1_2 | Transverse | 280 | | 60 |
| P1_3 | Longitudinal | 280 | Thick plastic encapsulation | 32 |

The test was carried out in that the corner of the glass slide was broken off and the output signal registered with an amplification of approx. 100 times.

Figure 3:
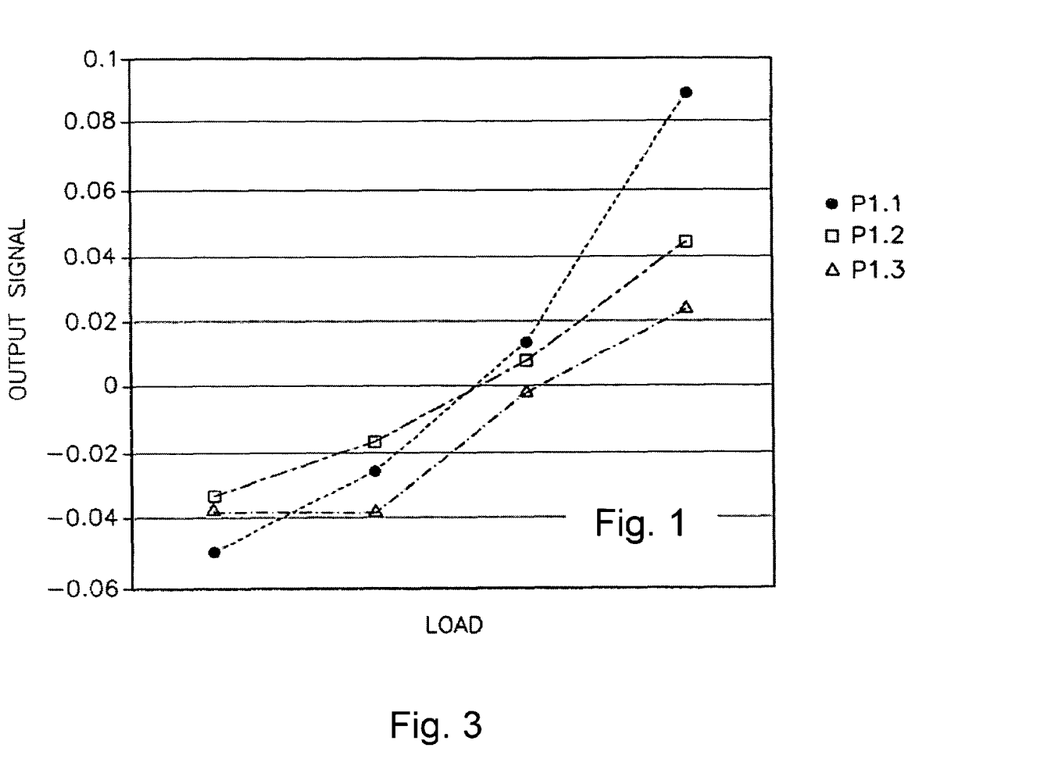
FIG. 3 shows the output signal as a function of load in positive and negative stretching for measurement of inductance change.

FIG. 3 shows the inductance change in different stretching for the sensors P1_, P1_2 and P1_3. Here it is clearly apparent that P1_1 and P1_2, which have bands cut out in the transverse direction, have the highest magneto-elastic relationship. These two samples also display a considerably higher permeability. This is also shown in glass breaking experiments where the signal levels in similar excitation will be higher for P1_1 and P1_2. P1_2 displays a considerably more broad band signal spectrum compared with P1_1 and P1_3. This may probably be explained by the larger glue quantities, see table 1.

Application in a Developed First Prototype of General Accelerometer with Real Static Measurement Functional Principle The transducer or indicator consists of an amorphous ferromagnetic material which possesses the property that it can be given extremely high permeability, 5,000<.mu.<200,000, at the same time as, for certain alloy compositions, it has a relatively high magnetostriction, 5<.mu..lambda..sub..sat<40 ppm. Taken as a whole, this gives a material with a very high magneto-elastic relationship and is, therefore, extremely suitable as sensor material. The transducer or indicator is composed of two amorphous bands of a size of 3.multidot.16.multidot.0.022 mm. The bands are glued to a fixing block. At the fixing block, a coil is wound around each band. The coils are connected in a half bridge. By connecting the coils in such a manner that a similar change in both bands does not give a signal, a high degree of insensitivity to temperature and other symmetric disruptions may be achieved. On flexing of the "beam" which consists of the two amorphous bands and an interjacent plastic band, a stretching in the one band will be obtained at the same time as a compression in the other band. The output signal from the coils will then be the opposite, i.e. an increase of inductance (permeability) on stretching and a reduction in compression.

Figure 14:
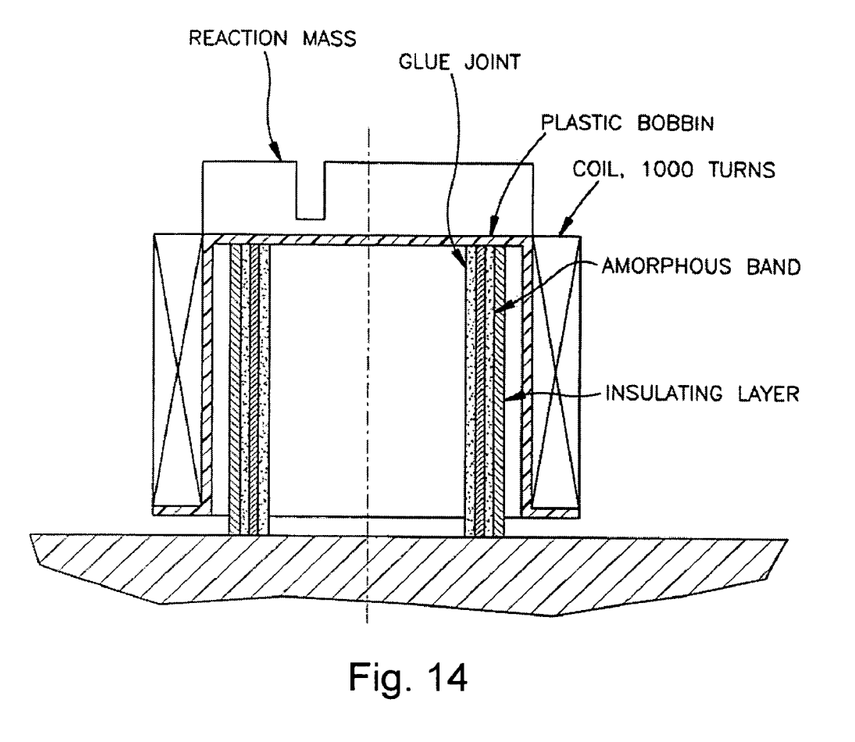
FIG. 14 is a schematic diagram of a possible realisation of an accelerometer or AE sensor (AE=acoustic emission) based on amorphous material.

The reaction mass (see FIG. 14), which is located in the end of the flexural beam gives a flexing moment which is proportional to the acceleration, the length of the beam and the mass. This naturally gives the possibility of adapting the accelerometer to almost any maximum acceleration whatever. The frequency performance is substantially determined by the rigidity of the beam and the mass of the reaction mass.

Theory

Since this transducer or indicator is to have real static measurement, the measurement principle cannot be based on induced tensions as a result of flow changes. In this case, it is necessary that the relative permeability of the band is measured using a carrier wave which should have a frequency roughly 10 times higher than the expected band width of the accelerometer.

For the linear case, the following linked equation should describe the function:

$$\Delta B = d \cdot \Delta \sigma + \mu_0 \cdot \mu \cdot \Delta H$$

where H is the magnetising field, B is the magnetic flow density, the permeability for free space $\mu_0 = 4\pi \cdot 10^{-7}$ Vs/Am and the relative permeability $\mu$ for, in this case, the amorphous band.

Further, $\sigma$ stands for mechanical tension and d is the magneto-elastic relationship coefficient. The prefix $\Delta$ designates change from the original value. The material parameter d may be approximated by taking maximum magnetostriction at constant mechanical stress, $\Delta \sigma = 0$, divided by magnetising field at magnetic saturation, i.e.

$$\frac{\lambda_{max}}{H_{max}} = d$$

Since $$\Delta \lambda = \frac{\Delta \sigma}{E^H} + d \cdot \Delta H$$

which, with $\lambda_{max} = 35 \cdot 10^{-6}$ and $H_{max} = 200$ A/m, gives the relationship factor $d = 1.75 \cdot 10^{-7}$ m/A, a very high value for all types of magneto-elastic relationship. The measurement magnitude which is of interest here is hence the permeability as a function of stretching. By assuming that a well defined magnetic state has been able to be achieved, i.e. constant and known magnetising field, the change in magnetic flow density can, with a revision of the above equations, be designated as:

$$\Delta B = d \cdot E^H \cdot \Delta \lambda$$

Hence, the change in magnetic flow density is proportional to the stretching in the band with the proportional constant $d \cdot E^H$ which, with $E^H = 100$ GPa, will be approximately $1.75 \cdot 10^4$ T.

Assume that the coils are connected in a half bridge and that we have a stretching of 10 ppm in the one band and a compression of 10 ppm in the other band. Since the H field may be assumed to be constant and that the change in the B field is proportional to the change in permeability and naturally also to the inductance in the coils, this implies that the output signal from the balanced bridge will be $$\Delta U = 1.75 \cdot 10^4 \cdot 2 \cdot 10 \cdot 10^{-6} = 0.35 \text{ V}$$

This is an output signal which is so powerful that it does not need to be amplified.

Measurement Results

Each coil has 800 turns, which gives an inductance of 8.2 mH. The half bridge is supplied with a sinusoidal voltage of an amplitude of 4.4 V and 19.3 kHz. Since the coils are connected in series, this implies that the bridge impedance may be kept in the order of magnitude of 10 k$\Omega$, which is a good adaptation to be driven by operational amplifier.

For calibration of the transducers, use is made of the earth's force of gravity of 9.81 G. This gives a sensitivity of 35 mV/G. The transducers appear to be saturated at approx. 1 V, which implies that the linear area is approx. ±0.5 C which is equivalent to ±14 G. The resonance frequency, which may be calculated as:

$$f_{res} = \sqrt{\frac{k}{m}} \cdot 2\pi$$

has, by studying an impulse response, been measured up to approx. 80 Hz, see FIG. 3.

Measurements in Accelerometer Test Equipment

In order to examine linearity, and to some degree frequency performance, measurements were carried out in the accelerometer test equipment.

A feature common to FIG. 4, FIG. 5, FIG. 6 and FIG. 7 is that a curve with relatively large output signal variations shows the output signal from the reference accelerometer, another curve with as good as equally large output signal variations shows the signal from the prototype accelerometer, while the almost solid line continuous curve shows the analytically simulated acceleration which should be exactly right. The scale on the axes is for the y axis acceleration in G and for the x axis time in seconds. Approximately 1.5 periods have been presented throughout.

Figure 8:
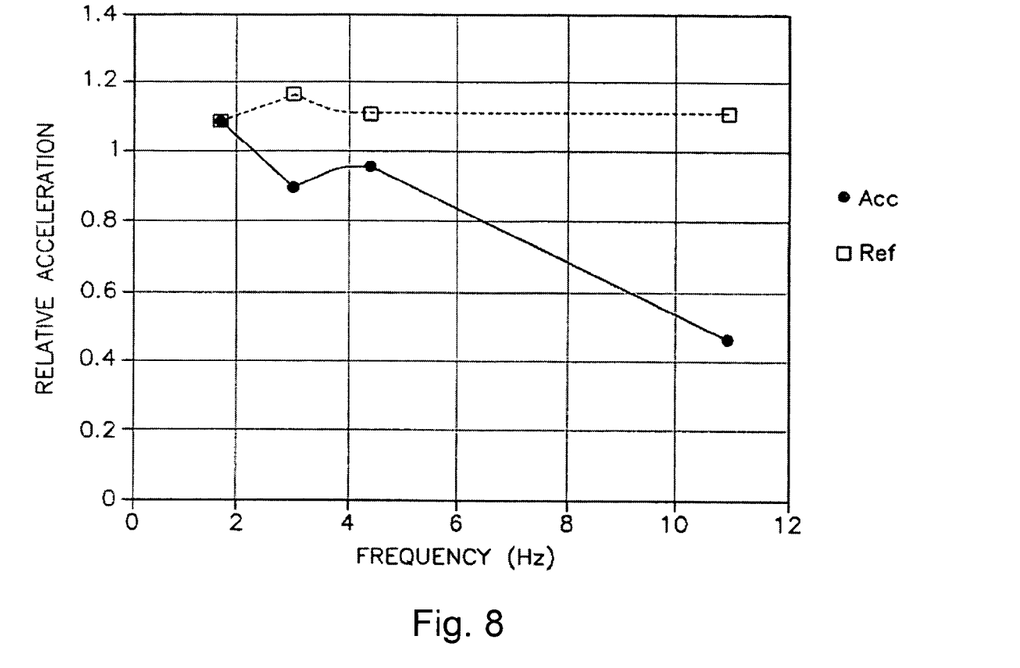
FIG. 8 shows an impulse response for the accelerometer where the signal on the Y axis is the output signal in (mV) and the X axis is the frequency axis.
Figure 9:
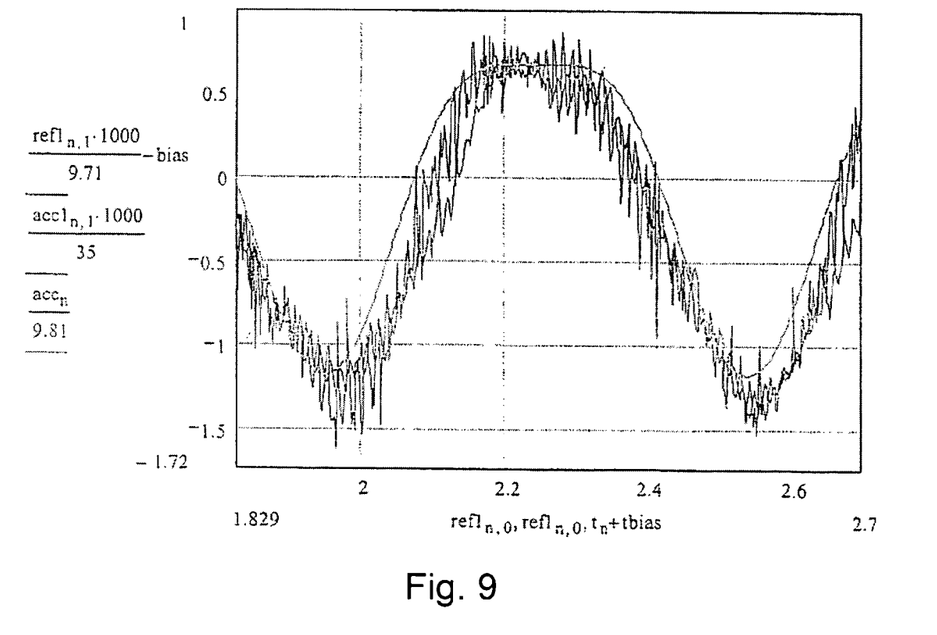
FIG. 9 shows the results of an accelerometer measurement at 1.7 Hz.
Figure 10:
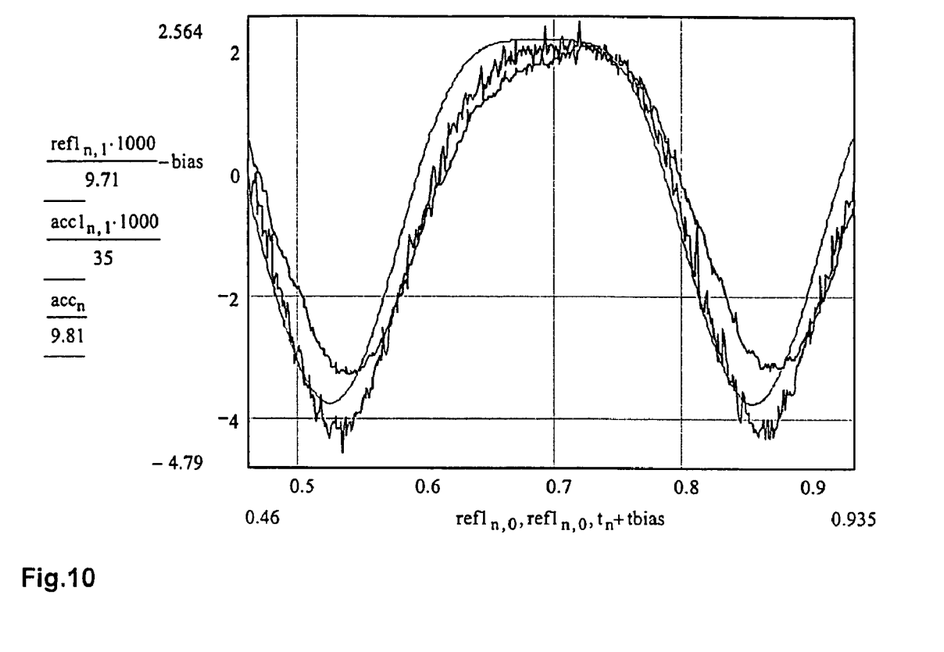
FIG. 10 shows the results of a measurement carried out at 3.0 Hz.
Figure 11:
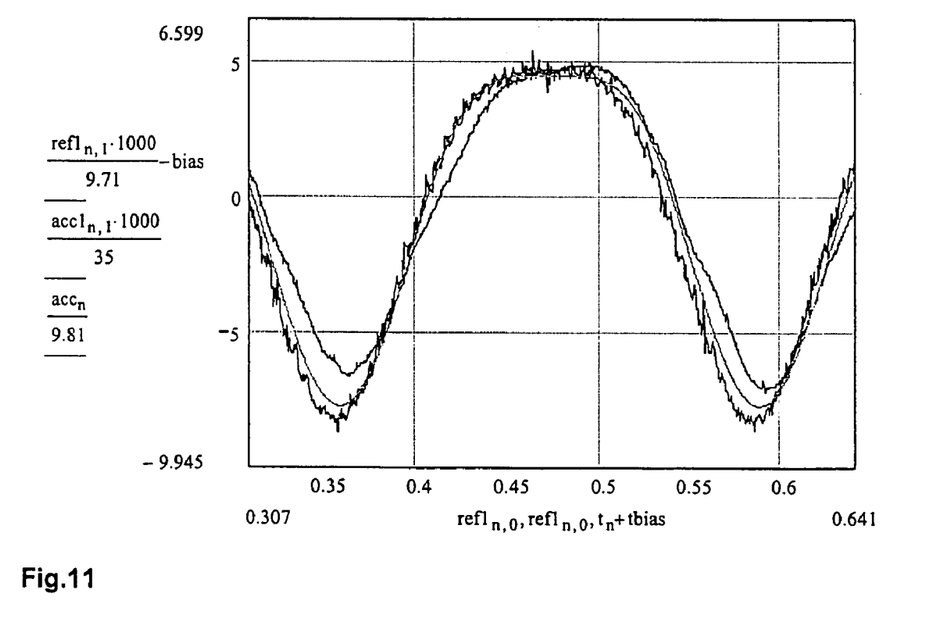
FIG. 11 shows the results of a measurement carried out at 4.4 Hz.
Figure 12:
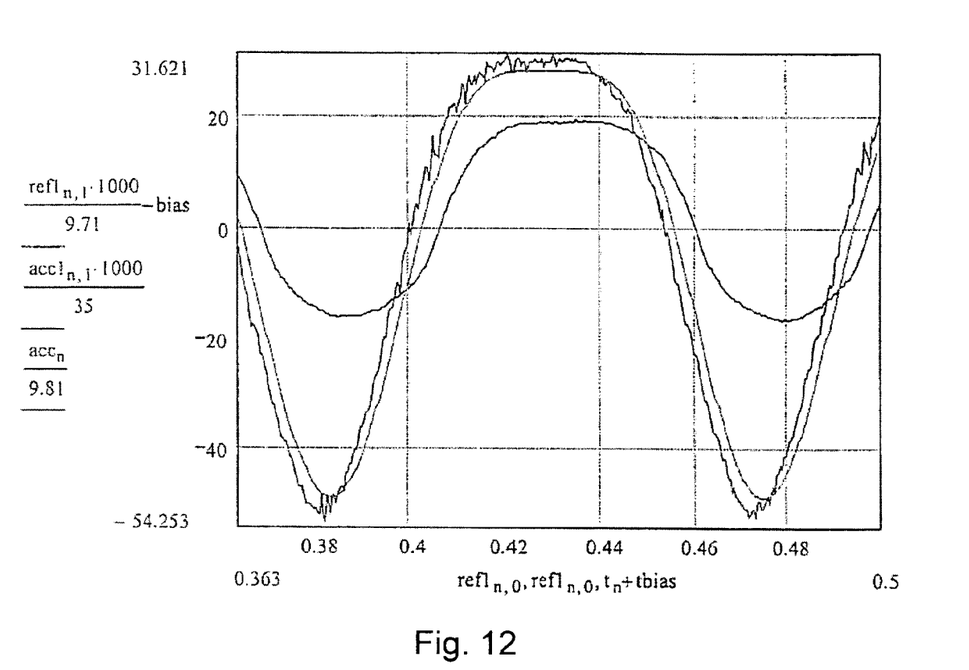
FIG. 12 shows the result of a measurement carried out at 10.94 Hz.
Figure 13:
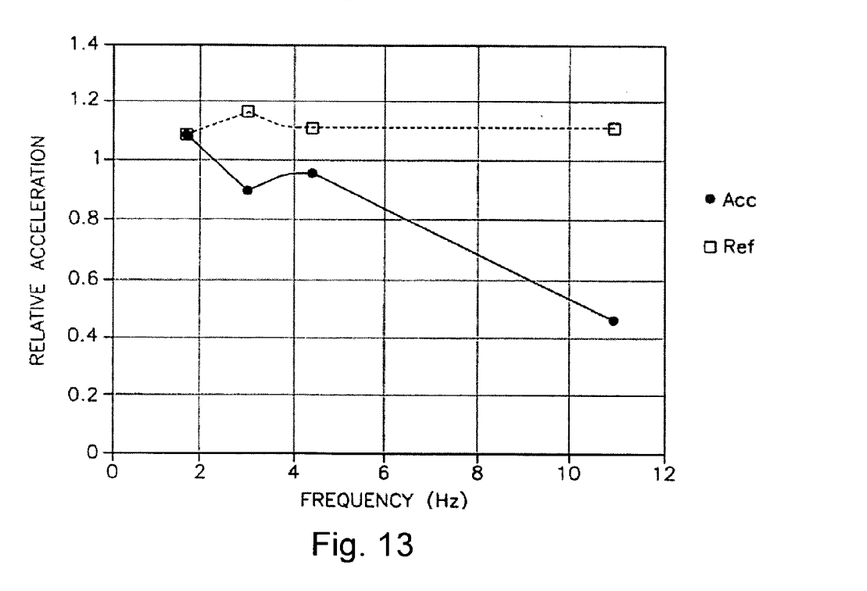
FIG. 13 shows a relative frequency response for a reference accelerometer and produced accelerometer type.

By comparing the output signal of the accelerometers and relating them to the simulated acceleration, a frequency response can be evolved, see FIG. 8.

The developed accelerometer displays good linearity up to the expected linearity limit of 14 G. There is no reason to assume any form of frequency dependence until the frequencies begin to approach the resonance frequency at 80 Hz. The decline at 11 Hz in FIG. 8 may be explained by the fact that saturation has been reached.

Application in Developed First Prototype of Sensor for Acoustic Emission

Functional Principle

The indicator or transducer consists of an amorphous ferromagnetic material which has the property that it may be given extremely high permeability, $5{,}000 < \mu < 200{,}000$, at the same time as, for certain alloy compositions, it has a relatively high magnetostriction, $5 < \lambda_{sat} < 40$ ppm. Taken as a whole, this gives a material with a very high magneto-elastic relationship and, as a result, is excellently suitable as sensor material. The indicator or transducer is composed of an amorphous band of a size of 3·18·0.022 mm. The band is wound two turns with an insulating plastic band in between. It is vitally important that the different strata of the band do not have electric contact with each other, since the band would then function as a short-circuited secondary winding. The resulting active cylinder is glued on the measurement object with a thin glue joint and to the bottom of a bowl-shaped plastic bobbin on the other side. On the bottom of the plastic bobbin, there is secured a reaction mass, while a 1,000 turn coil is wound on its side surface. This transducer principle is best suited for detecting dynamic cycles, since there is only one coil. By using two coils coupled in a half bridge (presupposes that the coils operate differently, i.e. that for positive acceleration one coil gives a positive output signal while the other gives a correspondingly negative signal), the advantages will be afforded that the effects of all currents (air-born electromagnetic waves etc.) and variations caused by external, global phenomena (heat, magnetic field, etc.) which occur symmetrically in relation to the coils will be reduced/eliminated.

The reaction mass (see FIG. 14) which is secured on the bottom of the plastic bobbin gives a reaction force on the active cylinder which is proportional to the acceleration and the mass. This naturally affords the possibility of adapting the accelerometer to almost any maximum acceleration and resonance frequency whatever. The frequency performance is determined substantially by the rigidity of the cylinder, as well as the mass of the reaction mass.

Theory

In order to detect high-frequency signals, it is advantageous and simple merely to detect the flow change and assume that it is proportional to the size of the deformation of the band. This implies that a magnetically well-defined initial state must be attained since an unmagnetised band gives no flow change in stretch change. In order to achieve a magnetised basic state, the earth magnetic field of 30-60 µT (20-40 A/m) is in principle sufficient, but on the other hand it is unpractical to need to monitor the direction and size of the earth magnetic field when a transducer or indicator is to be mounted and calibrated. There are two methods of attaining a good initial state:
1. Lightly magnetic encapsulation and direct current through the pickup coil.
2. Lightly magnetic encapsulation and bias magnetisation with a permanent magnet.

The size of the field should be such that the magnetisation will be 0.2-0.7 T, which implies that the magnetising field in the band should be of the order of magnitude of 2-56 A/m. The size of the field can generally be calculated from the formula $$H = \frac{B}{\mu_0 \cdot \mu}$$

where H is the magnetising field, B is the magnetic flow density, the permeability for free space $\mu_0 = 4\pi 10^{-7}$ Vs/Am and the relative permeability $\mu$ for, in this case, the amorphous band. By detecting the flow change in the band because of stretching/compression, the measurement signal will be obtained. For the linear case, the following linked equation should describe the function:

$$\Delta B = d \cdot \Delta \sigma + \mu_0 \mu \cdot \Delta H$$

Where $\sigma$ designates mechanical stress and d is the magneto-elastic relationship coefficient. The prefix $\Delta$ designates change from the original value. The material parameter d can be approximated by taking maximum magnetostriction in constant mechanical stress, $\Delta\sigma=0$, divided by magnetising field at magnetic saturation, i.e.

$$\frac{\lambda_{max}}{H_{max}} = d$$

since $$\Delta\lambda = \frac{\Delta\sigma}{E^H} + d \cdot \Delta H$$

which, with $\lambda_{max}=35\cdot 10^{-6}$ and $H_{max}=200$ A/m, gives the relationship factor $d=1.75\cdot 10^{-7}$ m/A, a very high value for all type of magneto-elastic relationship. The output signal which may be expected is proportional to the flow change and the mechanical stress $$U(t) = N \cdot A \cdot \frac{dB}{dt}$$

where N is the number of turns in the pickup coil and A is the cross sectional area of the amorphous band. By the assumption that $\Delta H=0$, the following equations apply:

$$\begin{cases} \Delta\sigma = \Delta\lambda \cdot E^H \\ \Delta B = d \cdot \Delta\sigma \end{cases}$$

where $E^H$ is the modulus of elasticity at constant magnetising field. Transition to the frequency plane and the utilisation of the above equations give:

$$\hat{U} = N \cdot A \cdot \omega \cdot d \cdot \Delta\hat{\lambda} \cdot E^H$$

where $\omega$ is the angular frequency in rows/sec. The circumflex indicates that it is the amplitude value which is intended.

Measurement Results

Figure 2:
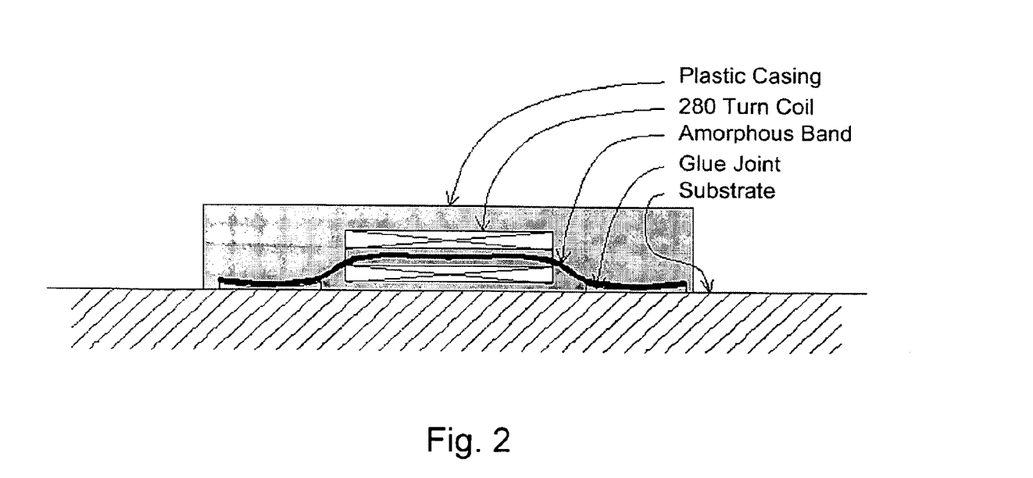
FIG. 2 is a schematic diagram of a sensor for detecting acoustic emission.

The coil which is measured has 650 turns, which gives an inductance of 3.2 mH. The resonance frequency may be calculated as:

$$f_{res} = \sqrt{\frac{k}{m}} \cdot \frac{1}{2\pi}$$

which, with the assumption that the modulus of elasticity is 100 GPa, the height of the active cylinder is 3 mm and the cross sectional area 2·3·π·0.022 mm² and the reaction mass is 4 gram, gives a resonance frequency of approx. 10 kHz. FIG. 2 shows a 50 times amplified output signal from the transducer when this has been mounted on a large iron blank and excited with a hammer blow.

Figure 15:
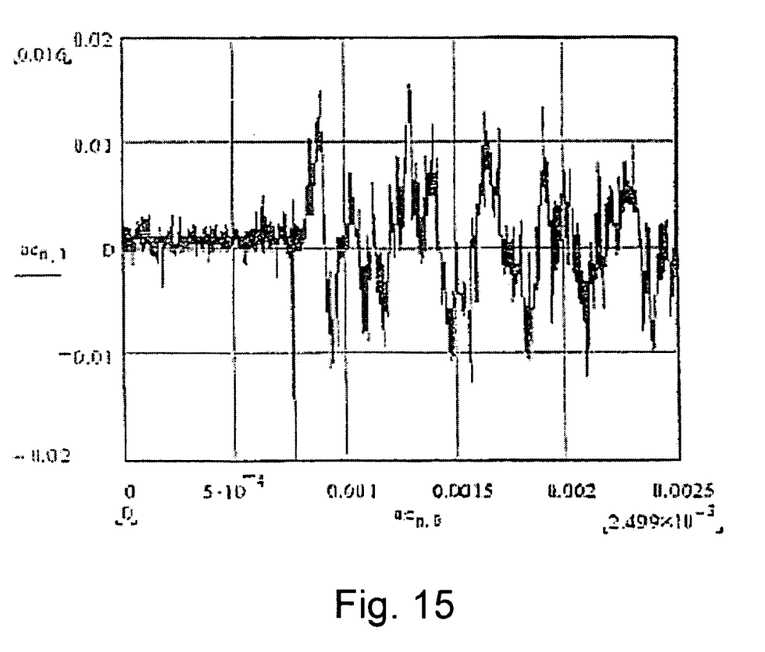
FIG. 15 shows the output signal of the AE sensor in transient exiting.

A frequency analysis in the time series in FIG. 15 shows that signals up to approx. 5 kHz occur broadband, thereafter there is a distinct peak at 8 kHz and one at 60 kHz. It appears probable that the 8 kHz signal is the transducer resonance, while the 60 kHz signal is that which is traditionally called acoustic emission, i.e. transient release of energy in, for example, material deformation. The broadband signal content below 5 kHz consists of vibrations on the test body.

What is claimed is:

1. A method of indicating and sensing a deviation, caused to a pertinent part in relation to a permanent state, whereby said detection is based upon a temporary inner material oscillation, a so called acoustic emission in real time, whereby a deviation dependent element being at least partly surrounded by one or more multi-turn coils, wherein:
   one or more band formed elements are applied in a freely suspended manner to said pertinent part,
   said band element is formed from an amorphous and/or nano-crystalline material,
   said band formed element is influenced by a bias magnetization, by applying a direct current through a pickup coil and/or using a permanent magnet,
   said deviation being transferred to said band element by causing internal atomic movements (oscillations) within said band element, and
   said deviation is causing an indication and a sensing of a detectible magnetic flow change (dB/dt) within said coil in proportion to said atomic movement or an indication and sensing of a detectable inductance change within said coil.

2. A method according to claim 1, wherein said amorphous and/or nano-crystalline material is subject to a magnetic heat-treatment in temperatures close to, however below, a crystallization temperature, causing high permeability and a relatively high magnetostriction.

3. A method according to claim 1, wherein said amorphous material is chosen a ferromagnetic material.

4. A method according to claim 1, wherein a permeability is chosen between 5000<μ>200 000 ppm.

5. A method according to claim 1, wherein a magnetostriction is chosen between 5<$\lambda_{sat}$<40 ppm.

6. A method according to claim 1, wherein said amorphous material is cut to form one or more band elements, where its longitudinal extension is chosen transversely of a chosen rolling direction.

7. A method according to claim 1, wherein said band element, attached to a glass slide, is caused to expose sensitivity within a frequency range of 40 kHZ to 1 MHz.

8. A method according to claim 1, wherein one or more, at least approximately 20 μm thick, amorphous or nano-crystalline, magnetically heat-treated band elements with high permeability and relative high magnetostriction are used.

9. An apparatus for indicating and sensing a deviation, caused to a pertinent part in relation to a permanent state, whereby said detection is based upon a temporary inner material oscillation, a so called acoustic emission in real time, whereby a deviation dependent element being at least partly surrounded by one or more multi-turn coils, wherein:
   one or more band formed elements are applied in a freely suspended manner to said pertinent part,
   said band element is formed from an amorphous and/or nano-crystalline material,
   said band formed element is influenced by a bias magnetization, by applying a direct current through a pickup coil and/or using a permanent magnet,
   said deviation being transferred to said band element by causing internal atomic movements (oscillations) within said band element, and
   said deviation is causing an indication and a sensing of a detectible magnetic flow change (dB/dt) within said coil in proportion to said atomic movement or an indication and sensing of a detectable inductance change within said coil.

10. An apparatus according to claim 9, wherein said amorphous and/or nano-crystalline material is subject to a magnetic heat-treatment in temperatures close to, however below, a crystallization temperature, causing a high permeability and a relatively high magnetostriction.

11. An apparatus according to claim 9, wherein one or more, at least approximately 20 μm thick, amorphous or nano-crystalline, magnetically heat-treated band elements of high permeability and relatively high magnetostriction are used.

12. An apparatus as claimed in claim 9, wherein said band element/elements with associated coil/coils are enclosed in an elastically deformable epoxy polymer.

13. An apparatus as claimed in claim 9, wherein the band element/elements and the coil/coils are glued to said permanent state as an object whose permanent state deviations are to be indicated.

14. An apparatus as claimed in claim 9, wherein the caused sensitivity is different depending upon chosen orientation of the detection direction in relation to a rolling direction of the band element/elements, as a consequence of directional dependent properties in the material.

15. An apparatus as claimed in claim 9, wherein the band elements with associated coils are bridge-and amplifier connected, in order to increase sensitivity and detectability, respectively.

16. The apparatus as claimed in claim 9, wherein it is realized as a glass breakage indicator.

* * * * *

UNITED STATES PATENT AND TRADEMARK OFFICE
CERTIFICATE OF CORRECTION

PATENT NO. : 7,282,822 B2  Page 1 of 1
APPLICATION NO. : 10/518126
DATED : October 16, 2007
INVENTOR(S) : Tord Cedell It is certified that error appears in the above-identified patent and that said Letters Patent is hereby corrected as shown below:

On the Title Item (73) should read,

Assignee: Covial Device AB, Helsingborg (SE)

Signed and Sealed this

Twenty-ninth Day of April, 2008

JON W. DUDAS
*Director of the United States Patent and Trademark Office*